(12) United States Patent
Gardner et al.

(10) Patent No.: US 10,725,490 B2
(45) Date of Patent: Jul. 28, 2020

(54) SWITCHES FOR BYPASS CAPACITORS

(71) Applicant: HEWLETT-PACKARD DEVELOPMENT COMPANY, L.P., Fort Collins, CO (US)

(72) Inventors: James Michael Gardner, Corvallis, OR (US); Eric Martin, Corvallis, OR (US); David Maxfield, Corvallis, OR (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/318,201

(22) PCT Filed: Oct. 13, 2016

(86) PCT No.: PCT/US2016/056814
§ 371 (c)(1),
(2) Date: Jan. 16, 2019

(87) PCT Pub. No.: WO2018/071024
PCT Pub. Date: Apr. 19, 2018

(65) Prior Publication Data
US 2019/0235558 A1 Aug. 1, 2019

(51) Int. Cl.
*G05F 3/08* (2006.01)
*H02H 9/00* (2006.01)
(Continued)

(52) U.S. Cl.
CPC .............. *G05F 3/08* (2013.01); *B41J 2/0457* (2013.01); *B41J 2/0458* (2013.01);
(Continued)

(58) Field of Classification Search
CPC .... B41J 2/04541; B41J 2/0457; B41J 2/0458; B41J 2/14072; B41J 2/17526;
(Continued)

(56) References Cited

U.S. PATENT DOCUMENTS 5,629,240 A     5/1997  Malladi et al.
6,263,170 B1 *  7/2001  Bortnem ............. B41J 2/04541
(Continued)

FOREIGN PATENT DOCUMENTS

CN    104115396    10/2014
CN    104252193    12/2014
(Continued)

OTHER PUBLICATIONS

Meng et al., An Improved Active Decoupling Capacitor for "Hot-Spot" Supply Noise Reduction in ASIC Designs, Feb. 2009, < http://ieeexplore.ieee.org/document/4768908/ >.
(Continued)

*Primary Examiner* — Juanita D Jackson
(74) *Attorney, Agent, or Firm* — Trop, Pruner & Hu, P.C.

(57) ABSTRACT

In some examples, a control circuit for a bypass capacitor includes a switch assembly that is activatable between a first state to connect the bypass capacitor between nodes, and a second state to disconnect the bypass capacitor between the nodes. The switch assembly includes a first switch to activate a first path comprising a first resistance to begin charging the bypass capacitor, and a second switch to, a delayed time after the activating of the first path, activate a second path comprising a second resistance lower than the first resistance, the activated second path connecting the bypass capacitor between the nodes.

15 Claims, 5 Drawing Sheets

(51) Int. Cl.
 B41J 2/045 (2006.01)
 B41J 2/14 (2006.01)
(52) U.S. Cl.
 CPC ....... *B41J 2/04541* (2013.01); *B41J 2/14072* (2013.01); *H02H 9/005* (2013.01)
(58) Field of Classification Search
 CPC .... B41J 2/0455; B41J 2/1753; B41J 2/17546; B41J 2002/14491; H02H 9/005; H02M 1/15; H02J 1/02
 See application file for complete search history.

(56) References Cited

U.S. PATENT DOCUMENTS

| | | | |
|---|---|---|---|
| 8,427,224 | B2 | 1/2013 | Lin et al. |
| 8,400,746 | B1 | 3/2013 | Keramat et al. |
| 9,418,873 | B2 | 2/2016 | Kumar et al. |
| 2007/0127169 | A1 | 6/2007 | Nguyen |
| 2007/0200006 | A1 | 8/2007 | Czimmek |
| 2008/0079764 | A1* | 4/2008 | Haflinger ............. B41J 2/04541 |
| 2012/0244916 | A1 | 9/2012 | Brown |
| 2015/0042296 | A1 | 2/2015 | Cheng |

FOREIGN PATENT DOCUMENTS

| | | |
|---|---|---|
| EP | 0999935 | 11/2003 |
| WO | WO-1991009440 A1 | 6/1991 |
| WO | WO-2011024101 A1 | 3/2011 |

OTHER PUBLICATIONS

English Translation of YuFei, Design and Implementation of Nozzle Control Circuit in Inkjet Color Printing System, Chinese Academic Journal, Mar. 31, 2015, Volume of Information Technology, China Academic Journal Electronic Magazine Co., Ltd. (10 pages).

\* cited by examiner

SWITCHES FOR BYPASS CAPACITORS

BACKGROUND

An electronic device can include active components that can be turned on and off during operation of the electronic device. The electronic device includes power rails that are used to supply power to the active components. For example, the power rails of an electronic device can include a supply voltage rail to carry a power supply voltage, and another power rail for a reference voltage, such as ground.

BRIEF DESCRIPTION OF THE DRAWINGS

Some implementations of the present disclosure are described with respect to the following figures.

DETAILED DESCRIPTION

Figure 1:
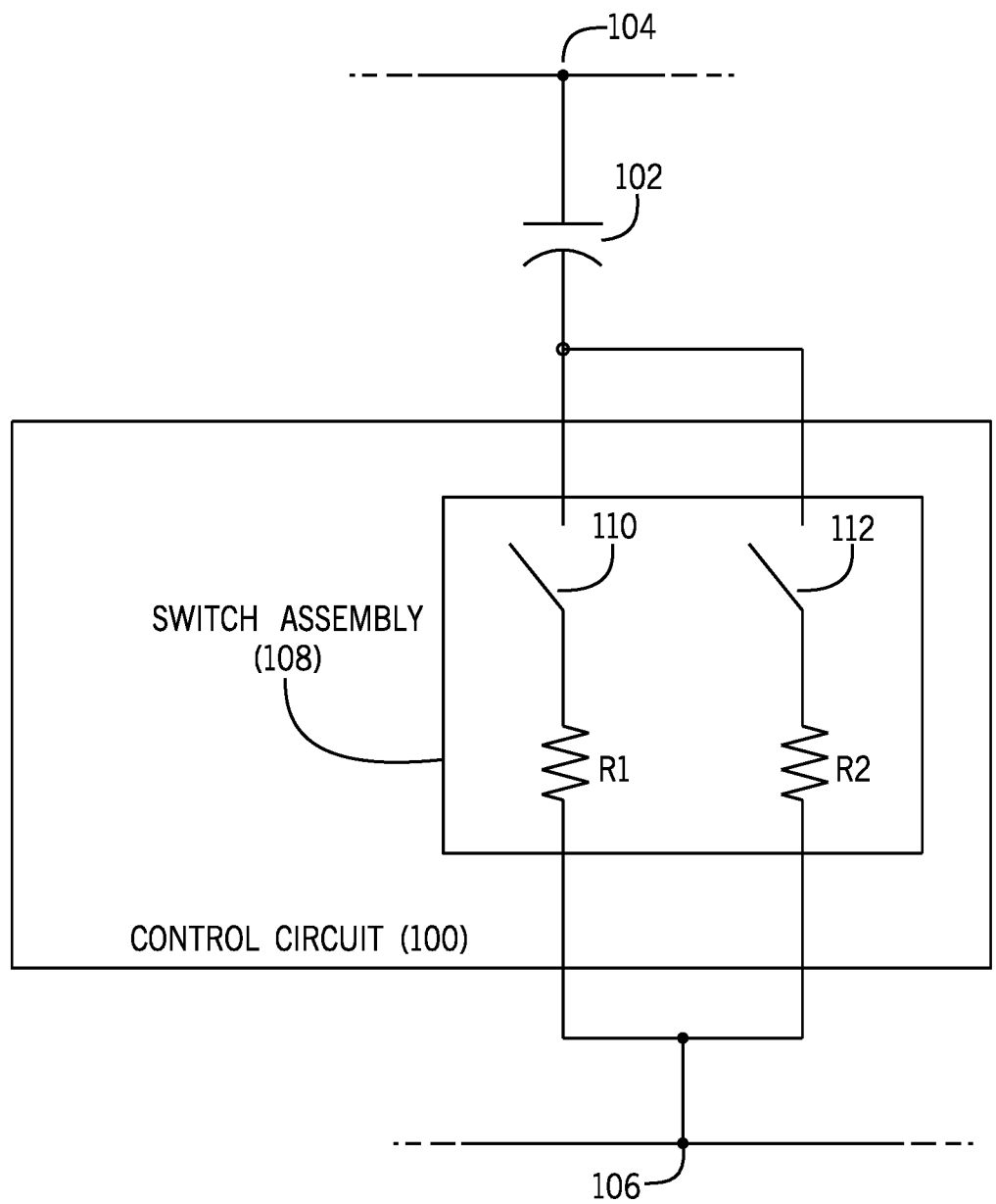
FIG. 1 is a block diagram of an arrangement that includes a control circuit for a bypass capacitor according to some examples.

In the present disclosure, the article "a," "an", or "the" can be used to refer to a singular element, or alternatively to multiple elements unless the context clearly indicates otherwise. Also, the term "includes," "including," "comprises," "comprising," "have," or "having" is open ended and specifies the presence of the stated element(s), but does not preclude the presence or addition of other elements.

Examples of electronic devices include an integrated circuit (IC) die, an electronic product (such as a computer, a handheld device, a wearable device, a printing system, a printing fluid cartridge with an integrated printhead, a game appliance, etc.), or any other device that includes an active electronic component that can be turned on or off during operation. An active electronic component is supplied with power during operation. The power can be supplied using power rails, which include electrical conductors. A first power rail can provide a power supply voltage, and a second power rail can provide a reference voltage (such as ground or another reference voltage). The power supply voltage is higher than the reference voltage. An electronic device can include more than two power rails in further examples.

Electronic devices can be operated at high frequencies, such as frequencies in the megahertz range, in the gigahertz range, or in a higher frequency range. Operations at high frequencies causes active electronic components, and signals input into and output from the active components, to switch at high rates, which can produce high frequency noise. Also, the switching of a large number of active electronic components can place a load on the power rails, which can result in transient spikes or dips (referred to as "transient deviations") of voltages on the power rails. Transient deviations on power rails can cause a malfunction of an electronic device, or may even damage the electronic device.

To address the issues of high frequency noise and transient deviations of power rail voltages, bypass capacitors can be connected between power rails of electronic devices. A bypass capacitor provides a low resistance path for high frequency noise signals, which helps to reduce noise effects caused by high frequency noise signals. Additionally, a bypass capacitor can store a reservoir of charge and can deliver a temporary supply of charge during switching of active electronic components to reduce transient deviations on power rails.

In some examples, a bypass capacitor is connected between power rails of an electronic device during the manufacturing stage of the electronic device. For example, jumpers can be set as part of the manufacture of the electronic device to connect the bypass capacitor between the power rails (or to maintain the bypass capacitor disconnected between the power rails). A jumper can refer to a conductor that can be added to connect components or to bypass a component. If the electronic device is an IC device that is built using a semiconductor manufacturing process, then a mask layer can be used during a semiconductor processing stage to set jumpers in the IC device.

Once jumpers are set during manufacture to connect or disconnect bypass capacitors, the bypass capacitors are permanently connected or disconnected, since the jumpers generally cannot be changed. In some cases, it may be desirable to disconnect bypass capacitors from power rails during certain tests, such as leakage tests to determine current leakage in electronic devices. The presence of bypass capacitors can slow down leakage tests. Moreover, after manufacture, a defect (such as a short circuit) in a bypass capacitor may be discovered, where the defect may detrimentally impact circuits in the electronic device or outside the electronic device. An inability to disconnect a defective bypass capacitor can render an entire electronic device useless, and thus the electronic device may have to be discarded. The likelihood of encountering defects in bypass capacitors is increased as the number of bypass capacitors in an electronic device is increased.

Defects in bypass capacitors can result in lowering the overall yield in the manufacture of electronic devices. An overall yield refers to the percentage of functional electronic devices out of the total population of electronic devices manufactured.

In accordance with some implementations of the present disclosure, a dynamically settable switch assembly is used to dynamically and selectively connect or disconnect a bypass switch between nodes (such as power rails or other electrical connection points) in an electronic device. A bypass capacitor is dynamically connectable or disconnectable if the bypass capacitor can be connected or disconnected after the electronic device has been manufactured. In some examples, a bypass capacitor can be dynamically connectable or disconnectable during operation of the electronic device. A bypass capacitor is selectively connectable or disconnectable if a controller can be programmed (either by a human or by a machine) to connect or disconnect the bypass capacitor in the electronic device.

An issue associated with dynamically connecting a bypass capacitor between nodes of an electronic device is that a transient condition can occur when the bypass capacitor that is initially disconnected is connected into the path between the nodes. For example, if a switch is turned on to quickly connect the bypass capacitor between the nodes, then the action of connecting the bypass capacitor between the nodes can cause transient deviations (in voltage and/or current) on the nodes. The transient deviations caused by connecting the bypass capacitor can be detrimental to components connected to the nodes, such as a power supply or other components. The transient deviations can be even greater when a switch (or multiple switches) connect multiple bypass capacitors between nodes at the same time or at substantially the same time (to within some specified time duration of one another where the effect of one bypass being connected between the nodes can add to the effect of another bypass being connected between the nodes).

To reduce the effect of the transient condition caused by dynamically connecting a bypass capacitor between nodes, a switch assembly according to some implementations can include switches that are used to provide different paths having different resistances between the nodes for different phases of bypass capacitor operation. An initial phase of the bypass capacitor operation is the capacitor charging phase, during which the bypass capacitor (which is initially discharged) is charged. A next phase of the bypass capacitor operation is the fully charged phase where the bypass capacitor is able to offer protection against noise and transient deviations due to switching of active components in an electronic device. In some examples, the switches of the switch assembly can be implemented using transistors, such as metal-oxide-semiconductor field-effected transistors (MOSFETs) or other types of transistors. In other examples, the switches can be implemented with other types of switching circuits.

FIG. 1 is a block diagram of an example arrangement that includes a control circuit 100 for dynamically connecting or disconnecting a bypass capacitor 102 between nodes 104 and 106, according to some implementations. Although just one bypass capacitor 102 is shown in FIG. 1, it is noted that in other examples, multiple bypass capacitors 102 can be provided.

The nodes 104 and 106 can be nodes on respective power rails, such as a first power rail to carry a power supply voltage, and a second power rail to carry a reference voltage (e.g., ground). The control circuit 100 includes a switch assembly 108 that includes a first switch 110 and a second switch 112. Each of the first and second switches 110 and 112 are controllable to an open state and a closed state. FIG. 1 shows the switches 110 and 112 in their open state, which means that no electrical current can flow through the switches 110 and 112. When the switch 110 or 112 is changed to its closed state, then an electrical current can flow through the switch.

The first switch 110 when closed is to activate a first path including a first resistance R1 to begin charging the bypass capacitor 102. In some examples, the resistance R1 includes a resistance of the first switch 110. In other examples, the resistance R1 includes a resistance of a discrete resistor in series with the first switch 110. In further examples, the resistance R1 includes a combination of the resistance of the first switch 110 and the resistance of a discrete resistor.

The first path when activated (by closing the first switch 110) connects the bypass capacitor 102 between the nodes 104 and 106. The bypass capacitor 102 is charged through this first path. A delayed time after the activating of the first path, the second switch 112 is closed to activate a second path including a second resistance R2 lower than the first resistance R1, where the activated second path connects the bypass capacitor 102 between the nodes 104 and 106. The second resistance R2 can include a resistance of the second switch 112, or a resistance of a discrete resistor in series with the second switch 112, or a combination of the resistance of the second switch 112 and the resistance of a discrete resistor.

In some examples, the switches 110 and 112 can be implemented as transistors, such as MOSFETs. In other examples, the switches 110 and 112 can be implemented with other types of transistors or other types of switching circuits.

A MOSFET has a channel that is provided between a source and a drain of the MOSFET. When the MOSFET is activated by setting a gate of the MOSFET to an active voltage level (where the active voltage level is a high voltage level if the MOSFET is an N-channel MOSFET, and the active voltage level is a low voltage if the MOSFET is a P-channel MOSFET), current can flow between the source and drain through the channel. The channel of a MOSFET can be made to be longer and/or narrower to increase the resistance of the MOSFET. The channel of a MOSFET can be made shorter and/or wider to decrease the resistance of the MOSFET. In further examples, instead of changing a size (its length and/or width) to adjust a resistance of the MOSFET, the level of the control voltage applied to the gate of the MOSFET can be varied instead. The MOSFET can be partially turned on by applying a lower voltage than the voltage to which the drain of the MOSFET is connected. The partially turned on MOSFET has a higher resistance than a fully on MOSFET.

By using the first path with the higher resistance R1 (higher than the resistance R2 of the second path) to charge the bypass capacitor 102, the bypass capacitor 102 is charged at a slower rate between the nodes 104 and 106, which reduces transient conditions on the node 104 and/or node 106. After the bypass capacitor 102 has been charged (or substantially charged to within a threshold percentage of full charging), the second path including the lower resistance R2 is activated by closing the second switch 112 to connect the bypass capacitor 102 between the nodes 104 and 106. Delaying the activation of the second switch 112 allows for the bypass capacitor 102 to be substantially charged through the first path including the higher resistance R1, before the bypass capacitor 102 is connected between the nodes 104 and 106 through a lower resistance path.

Figure 2:
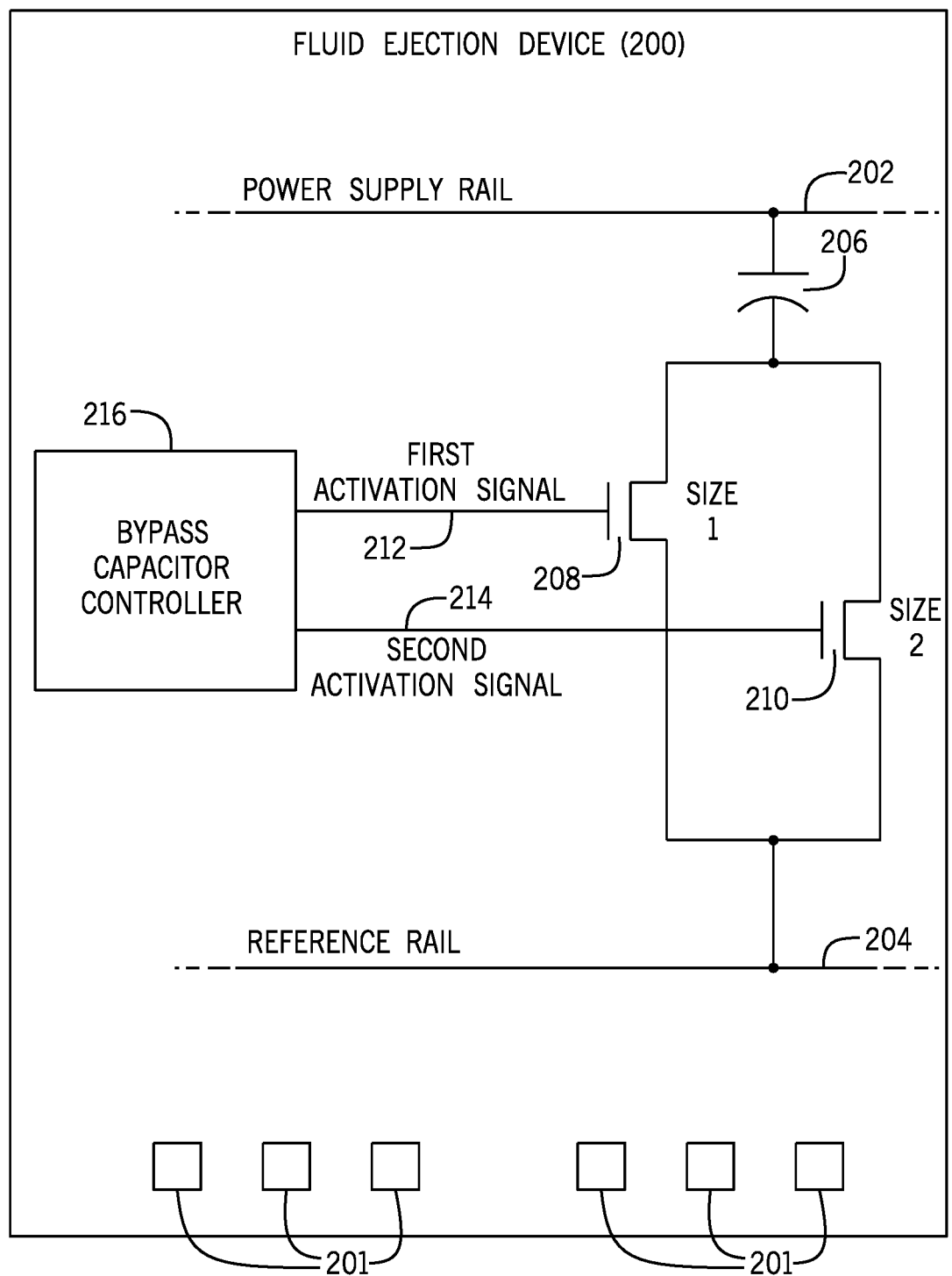
FIG. 2 is a block diagram of a fluid ejection device according to some examples.

FIG. 2 is a block diagram of an example fluid ejection device 200. The fluid ejection device 200 includes nozzles 201 through which fluid can be dispensed from the fluid ejection device 200. In some examples, the fluid ejection device 200 include a printhead to dispense printing fluid to a target in a printing system. In a printhead, nozzles can have heating elements, such as firing resistors, that are activated to cause printing fluid droplets to be ejected from respective nozzles. A heating element when activated generates heat to vaporize a printing fluid in a firing chamber of a nozzle, which causes expulsion of a droplet of the printing fluid from the nozzle. A printing system can be a two-dimensional (2D) or three-dimensional (3D) printing system. A 2D printing system dispenses printing fluid, such as ink, to form images on print media, such as paper media or other types of print media. A 3D printing system forms a 3D object by depositing successive layers of build material. Printing fluids dispensed from the 3D printing system can include ink, as well as fluids used to fuse powders of a layer of build material, detail a layer of build material (such as by defining edges or shapes of the layer of build material), and so forth.

In further examples, the fluid ejection device 200 can be used in a non-printing system, such as a fluid sensing system, a medical system, a vehicle, a fluid flow control system, and so forth The fluid ejection device 200 can be implemented as an integrated circuit (IC) die (referred to as a "fluid ejection die") that includes the nozzles 201 along with control circuitry to control firing of the nozzles 201. In other examples, the fluid ejection device 200 can include a product that includes a fluid ejection die or multiple fluid ejection dies. An example of such a product is a fluid cartridge (e.g., an ink cartridge) to which a fluid ejection die, or multiple fluid ejection dies, can be attached.

Although reference is made to a fluid ejection device 200, it is noted that in further examples, a bypass capacitor and a dynamic switch assembly as depicted in FIG. 2 can be used in other types of electronic devices.

A portion of control circuitry of the fluid ejection device 200 used to control firing of the nozzles 201 or to perform other tasks is shown in FIG. 2. This portion of the control circuitry is connected to power rails 202 and 204, where in some examples the power rail 204 is a power supply rail to supply a specified power supply voltage, and the power rail 204 is a reference voltage rail, such as a ground rail. The fluid ejection device 200 includes a bypass capacitor 206, a first switch 208 having a first resistance, and a second switch 210 having a second resistance that is lower than the first resistance. In examples according to FIG. 2, the switches 208 and 210 are implemented as transistors, such as MOSFETs. The transistors can have different sizes, such as different channel sizes (lengths and/or widths), to provide different resistances. In other examples, a resistance of a transistor can be increased by partially turning on the transistor.

The first switch 208 is controlled by a first activation signal 212, and the second switch 210 is controlled by a second activation signal 214. The first and second activation signals 212 and 214 are output by a bypass capacitor controller 216. As used here, the term "controller" can refer to any or some combination of the following: a microprocessor, a core of a multi-core microprocessor, a microcontroller, a programmable gate array, a programmable integrated circuit device, or any other hardware processing circuit. In further examples, a "controller" can refer to a combination of a hardware processing circuit and machine-readable instructions executable on the hardware processing circuit.

The bypass capacitor controller 216 can assert the first activation signal 212 to turn on (or close) the switch 208, and can deassert the first activation signal 212 to turn off (or open) the first switch 208. The bypass capacitor controller 216 can assert the second activation signal 214 to turn on the second switch 210, and deassert the second activation signal 214 to turn off the second switch 210. A signal when asserted can refer to either a low or high state, depending upon whether the device that is driven by the signal is an active low or active high device. Similarly, a signal that is deasserted can refer to either high or low state, depending upon whether the device that is driven by the signal is an active low or active high device.

In specific examples, the transistors used to implement the switches 208 and 210 can be N-channel MOSFETs, in which case the first and second activation signals 212 and 214 are active high signals (in other words, the signals 212 and 214 when asserted high would cause the respective N-channel MOSFETs to turn on). In other examples, the transistors used to implement the switches 208 and 210 can be P-channel MOSFETs, in which case the first and second activation signals 212 and 214 are active low signals (in other words, the signals 212 and 214 when asserted low would cause the P-channel MOSFETs to turn on).

In some examples, the second activation signal 214 is asserted a delayed time after assertion of the first activation signal 212. In more specific examples, the second activation signal 214 is a delayed version of the first activation signal 212, where the delay can be provided by an analog delay circuit or a digital delay circuit in the bypass capacitor controller 216.

In other examples, when the first activation signal 212 is asserted to turn on the transistor 208, the bypass capacitor controller 216 can partially assert the second activation signal 214 (such as to an intermediate voltage between a low voltage and a high voltage) along with assertion of the first activation signal 212 to partially turn on the second transistor 210 to charge the bypass capacitor 206.

By being able to dynamically connect or disconnect the bypass capacitor 206 between the power rails 202 and 204, the bypass capacitor controller 216 can disconnect the bypass capacitor 206 between the power rails 202 and 204 during certain times, such as during a test mode of the fluid ejection device 200 (such as to perform a leakage test). The bypass capacitor controller 216 can then connect the bypass capacitor 206 between the power rails 202 and 204 during other times, such as during an operational mode of the fluid ejection device 200.

Figure 3:
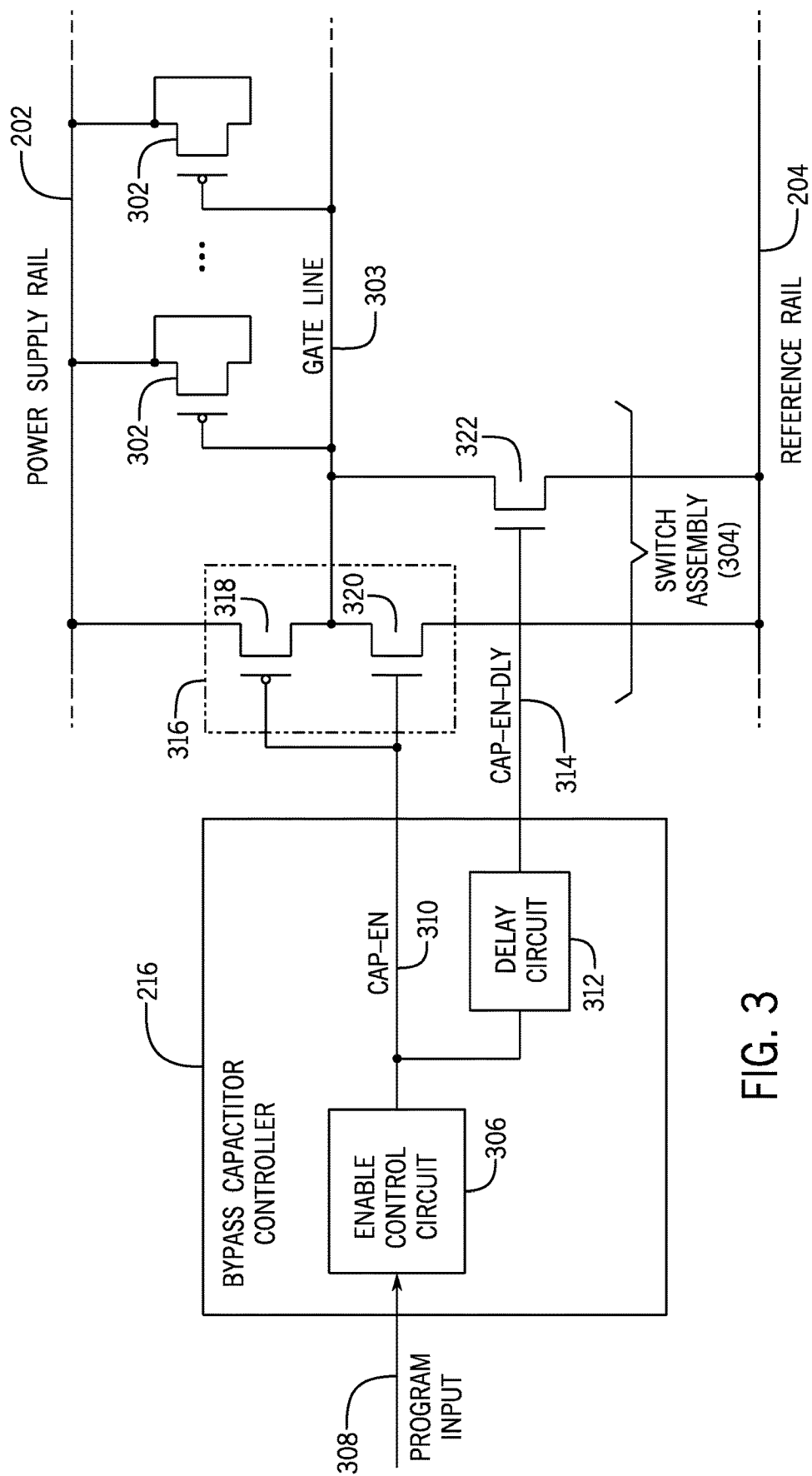
FIG. 3 is a block diagram of an arrangement that includes a bypass capacitor controller, bypass capacitors, and a switch assembly according to further examples.

FIG. 3 shows an example arrangement that includes the bypass capacitor controller 216, bypass capacitors 302, and a switch assembly 304 according to further implementations. Although FIG. 3 shows a specific arrangement of P-channel and N-channel MOSFETs to implement certain circuitry, it is noted that different types of transistors can be used in other examples.

The switch assembly 304 includes a P-channel MOSFET 318, an N-channel MOSFET 320, and an N-channel MOSFET 322.

The bypass capacitors 302 are implemented as P-channel MOSFETs. The source and drain of each P-channel MOSFET are connected together and to the power supply rail 202. In other examples, the bypass capacitors 302 can be implemented using N-channel MOSFETs, or using polysilicon over oxide, or with any other structure that includes electrically conductive layers sandwiching a dielectric layer.

The bypass capacitor controller 216 includes an enable control circuit 306 that receives a program input 308 and outputs a CAP-EN signal 310, which is an example of the first activation signal 212 shown in FIG. 2. The program input 308 can include a signal or multiple signals, or can include a message, or can include any other indication that can be used to indicate to the enable control circuit 306 that the bypass capacitors 302 are to be enabled, i.e., connected between the power rails 202 and 204. The CAP-EN signal 310 is provided as an input to a delay circuit 312, which produces a CAP-EN-DLY signal 314, which is a delayed version of the CAP-EN signal 310. The CAP-EN-DLY signal 314 is an example of the second activation signal 214 shown in FIG. 2.

The delay circuit 312 can include an analog delay circuit, implemented with resistors and capacitors to add a delay to transitions (low-to-high and high-to-low transitions) of a signal that passes through the analog delay circuit 312. In other examples, the delay circuit 312 can be a digital delay circuit, implemented as a series of inverters or implemented with a series of flip-flops, for example.

In examples according to FIG. 3, the gates of the P-channel MOSFETs that implement the bypass capacitors 302 are connected to a gate line 303. The gate line 303 is driven by the output of an inverter 316 that includes the P-channel MOSFET 318 and the N-channel MOSFET 320 of the switch assembly 304. The gates of the MOSFETs 318 and 320 are connected to the CAP-EN signal. When the CAP-EN signal 310 is deasserted low by the enable control circuit 306 (which indicates that the bypass capacitors 302 are to be disconnected between the power rails 202 and 204), the P-channel MOSFET 318 is turned on, and the N-channel MOSFET 320 is turned off, which pulls the gate line 303 high (to the voltage of the power supply rail 202) and turns off the P-channel MOSFETs of the bypass capacitors 302.

When the CAP-EN signal 310 is asserted high by the enable control circuit 306 (which indicates that the bypass capacitors 302 are to be connected between the power rails 202 and 204), the P-channel MOSFET 318 is turned off, and the N-channel MOSFET 320 is turned on, which pulls the gate line 303 low (to the voltage of the reference rail 204). The gate line 303 driven low causes the P-channel MOSFETs of the bypass capacitors 302 to turn on, such that the bypass capacitors 302 are connected between the power rails 202 and 204.

In some examples, the N-channel MOSFET 320 of the inverter 316 has a longer channel length and/or a narrower channel width to provide a higher resistance. This is compared to the N-channel MOSFET 322 of the switch assembly 304, which has a shorter channel length and/or wider channel width to provide a lower resistance. By using the N channel MOSFET 320 that has a higher resistance to initially connect the bypass capacitors 302 between the power rails 202 and 204, the bypass capacitors 302 are charged at a slower rate to reduce deviations on the power rails 202 and 204.

After the bypass capacitors 302 have been substantially charged, the CAP-EN-DLY signal 314 is asserted (a delayed time after assertion of the CAP-EN signal) to turn on the N-channel MOSFET 322, which provides a lower resistance path for the bypass capacitors between the power rails 202 and 204.

Figure 4:
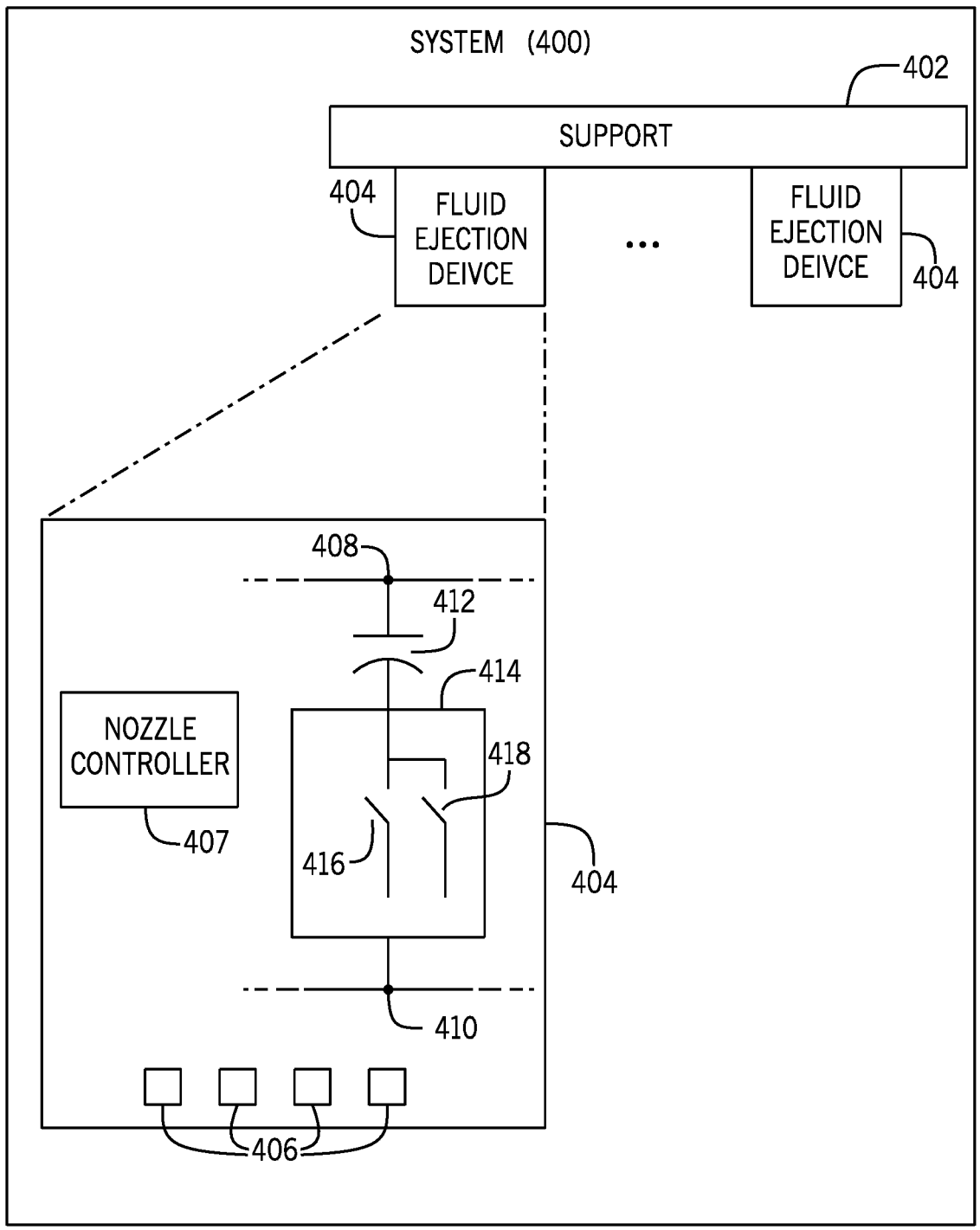
FIG. 4 is a block diagram of a system that includes fluid ejection devices according to some examples.

FIG. 4 is a block diagram of an example system 400 that includes a support 402 and multiple fluid ejection devices 404 mounted or attached to the support 402. In some examples, the system 400 can be a printing system, and the fluid ejection devices 404 can be printheads. For example, the system 400 can be a page-wide printing system, where a row or array of fluid ejection devices 404 can be arranged along the width of a target (e.g., a print medium or a layer of build material of a 3D object) so that fluid can be dispensed simultaneously from the fluid ejection devices 404 to the target.

In other examples, just one fluid ejection device 404 is mounted or attached to the support 402, which can be moveable with respect to a target so that the support 402 (e.g., a carriage) can be moved relative to the target to deliver fluid to the target.

Each fluid ejection device 404 can be a fluid ejection die, or can be a product that includes a fluid ejection die. A fluid ejection device 404 includes nozzles 406 through which a fluid can be dispensed. The fluid ejection device 404 further includes a nozzle controller 407 to control activation of the nozzles 406, such as in response to commands received by the nozzle controller 407 from a controller (not shown) in the system 400.

The fluid ejection device 404 further includes nodes 408 and 410, a bypass capacitor 412, and a switch assembly 414. The switch assembly 418 is activatable between a first state to connect the bypass capacitor 412 between the nodes 408 and 410, and a second state to disconnect the bypass capacitor 412 between the nodes 408 and 410.

The switch assembly 414 includes a first switch 416 associated with a first resistance (either the resistance of the first switch 416 or the resistance of a discrete resistor, or both), and a second switch 418 associated with a second resistance (either the resistance of the second switch 418 or the resistance of a discrete resistor, or both), where the second resistance is lower than the first resistance. The first switch 416 when activated activates a first path that has the first resistance to begin charging the bypass capacitor 412. The second switch 418 when activated a delayed time after the activating of the first switch 416, activate a second path that includes the second resistance to connect the bypass capacitor between the nodes 408 and 410.

Figure 5:
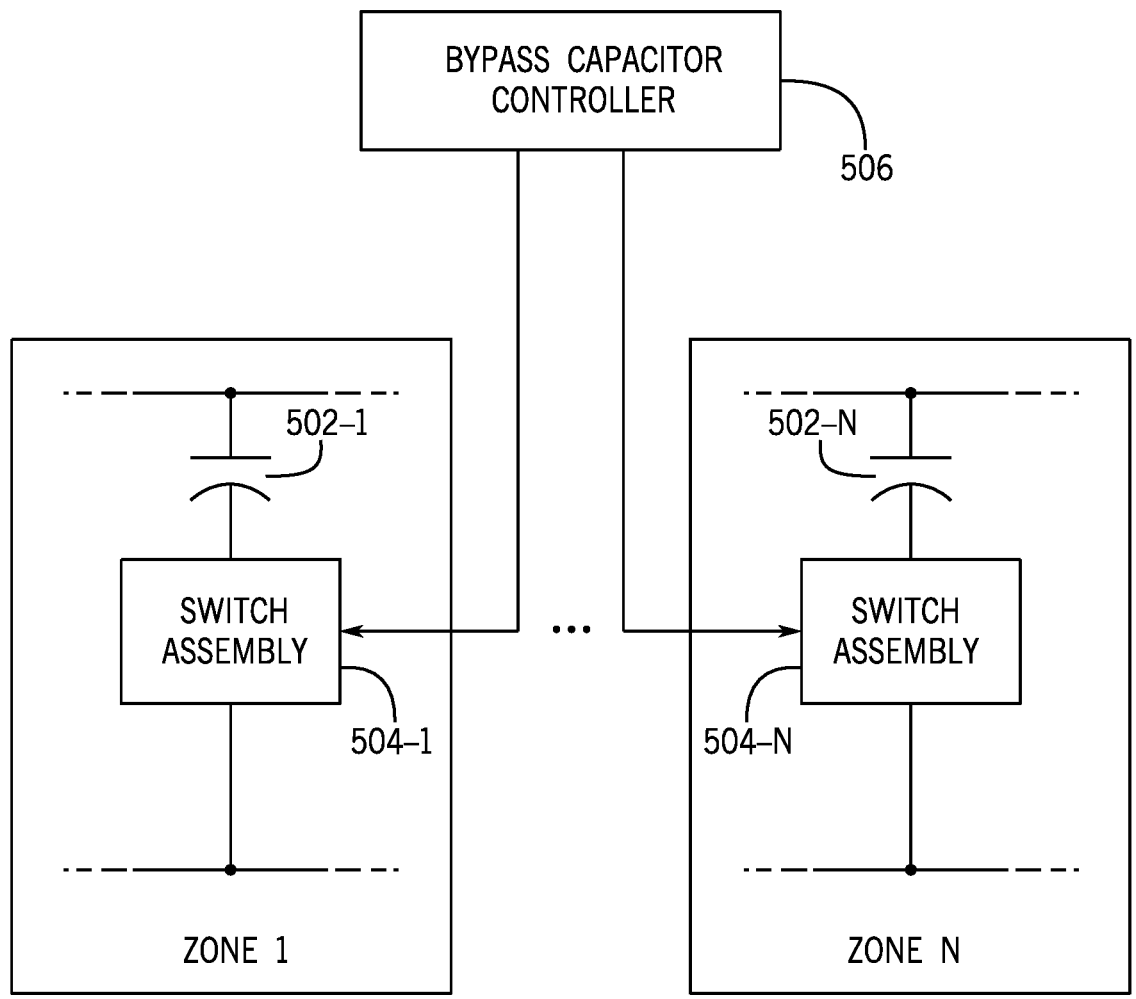
FIG. 5 is a block diagram of an arrangement that includes a bypass capacitor controller and multiple zones including corresponding bypass capacitors and switch assemblies, according to further examples.

FIG. 5 shows another example arrangement according to alternative implementations. In FIG. 5, multiple zones (zone 1, . . . , zone N, where N is greater than 1) can be included in an electronic device, where the zones have respective bypass capacitors 502-1, . . . , 502-N. Each bypass capacitor 502-$i$ ($i$=1 to N) is associated with a respective switch assembly 504-$i$ to control the connection or disconnection of the bypass capacitor between respective nodes. The switch assemblies 504-1 to 504-N are controlled by a bypass capacitor controller 506. The bypass capacitor controller 506 can independently and individually control the switch assemblies 504-1 to 504-N to dynamically connect or disconnect the respective bypass capacitors 502-1 to 502-N between respective nodes. For example, the bypass capacitor 506 can control the switch assembly 504-1 to connect the bypass capacitor 502-1 between respective nodes in zone 1, whereas the bypass capacitor controller 506 can control the switch assembly 504-N to disconnect the bypass capacitor 502-N between the nodes in zone N. In this way, greater flexibility and finer granularity of control can be provided to individually activate or deactivate bypass capacitors in respective zones of the electronic device.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A control circuit for a bypass capacitor, comprising:
    a switch assembly that is activatable between a first state to connect the bypass capacitor between nodes, and a second state to disconnect the bypass capacitor between the nodes,
    the switch assembly comprising:
        a first switch to activate a first path comprising a first resistance to begin charging the bypass capacitor, and
        a second switch to, a delayed time after the activating of the first path, activate a second path comprising a second resistance lower than the first resistance, the activated second path connecting the bypass capacitor between the nodes.

2. The control circuit of claim 1, wherein the first switch is connected to a first activation signal, the first switch to turn on to activate the first path in response to assertion of the first activation signal, and
    wherein the second switch is connected to a second activation signal that is delayed from the first activation signal, the second switch to turn on to activate the second path in response to assertion of the second activation signal.

3. The control circuit of claim 2, wherein the second activation signal is a delayed version of the first activation signal.

4. The control circuit of claim 1, wherein the first switch comprises a first transistor, and the second switch comprises a second transistor.

5. The control circuit of claim 4, wherein the first resistance is a resistance of the first transistor when activated, and the second resistance is a resistance of the second transistor when activated, the first and second transistors being of different sizes.

6. The control circuit of claim 4, wherein the first resistance comprises a resistor in series with a resistance of the first transistor when activated, and the second resistance is a resistance of the second transistor when activated.

7. A fluid ejection device comprising:
nozzles to eject fluid;
power rails;
a bypass capacitor;
a first switch comprising a first resistance and controllable by a first activation signal;
a second switch comprising a second resistance lower than the first resistance, the second switch controllable by a second activation signal; and
a controller to:
assert the first activation signal to connect the bypass capacitor between the power rails to begin charging the bypass capacitor that is initially discharged, and
assert the second activation signal a delayed time after the first activation signal to connect the bypass capacitor between the power rails after the bypass capacitor has been charged.

8. The fluid ejection device of claim 7, wherein the controller comprises a delay circuit comprising an input to receive the first activation signal, and an output to provide the second activation signal.

9. The fluid ejection device of claim 7, wherein the controller is to deassert the first and second activation signals to disconnect the bypass capacitor between the power rails.

10. The fluid ejection device of claim 7, wherein the controller is to partially assert the second activation signal along with assertion of the first activation signal to partially turn on the second switch to charge the bypass capacitor.

11. The electronic device of claim 7, further comprising:
a plurality of zones, wherein the bypass capacitor is a first bypass capacitor for a first zone of the plurality of zones;
a second bypass capacitor for a second zone of the plurality of zones,
wherein the controller is to selectively connect or disconnect the second bypass capacitor between the power rails, independently of selective connection or disconnection of the first bypass capacitor between the power rails.

12. The electronic device of claim 7, wherein the controller is to dynamically connect or disconnect the bypass capacitor between the power rails during operation of the electronic device.

13. The electronic device of claim 12, wherein the controller is to disconnect the bypass capacitor between the power rails during a test mode of the electronic device, and to connect the bypass capacitor between the power rails during an operational mode of the electronic device.

14. A system comprising:
a support; and
a plurality of fluid ejection devices attached to the support, a fluid ejection device of the plurality of fluid ejection devices comprising:
nozzles to dispense fluid;
a bypass capacitor;
a switch assembly that is activatable between a first state to connect the bypass capacitor between nodes, and a second state to disconnect the bypass capacitor between the nodes,
the switch assembly comprising:
a first switch to activate a first path comprising a first resistance to begin charging the bypass capacitor, and
a second switch to, a delayed time after the activating of the first switch, activate a second path comprising a second resistance lower than the first resistance, the second path connecting the bypass capacitor between the nodes.

15. The system of claim 14, wherein the fluid ejection device comprises a fluid ejection die that includes the nozzles, the bypass capacitor, and the switch assembly.

* * * * *